United States Patent [19]

Duffy

[11] 4,398,347

[45] Aug. 16, 1983

[54] TOOL FOR SEVERING THERMOPLASTIC ELECTRICAL CABLE SHEATH

[76] Inventor: Eugene P. Duffy, 1025 Lowry Ave. NE., Minneapolis, Minn. 55418

[21] Appl. No.: 275,930

[22] Filed: Jun. 22, 1981

[51] Int. Cl.³ .......................................... B26B 27/00
[52] U.S. Cl. ................................... 30/90.1; 81/9.5 R; 83/200.1
[58] Field of Search ............... 81/9.5 R; 30/166, 90.1; 83/16, 200.1, 171

[56] References Cited

U.S. PATENT DOCUMENTS

| D. 247,268 | 2/1978 | Quenot | D2/400 |
|---|---|---|---|
| 809,532 | 1/1906 | Schnackenberg | 30/116 |
| 1,906,582 | 5/1933 | Gundlach | 30/116 |
| 2,192,056 | 2/1940 | Watts | 264/139 |
| 3,143,635 | 8/1964 | Hooker | 219/221 |
| 3,310,082 | 3/1967 | La Tramerye | 30/166 |
| 3,665,602 | 5/1972 | Salahshourin | 30/90.1 |
| 3,968,670 | 7/1976 | Quenot | 70/456 |
| 4,055,616 | 10/1977 | Keen et al. | 264/139 |

*Primary Examiner*—Jimmy C. Peters
*Attorney, Agent, or Firm*—Kinney, Lange, Braddock, Westman & Fairbairn

[57] ABSTRACT

A tool for severing a thermoplastic sheath forming the outer layer of an electrical cable includes an elongated flexible sheath-severing line having an outer sleeve of woven polyester fabric covering a center core of polyester filaments. This line is stored on a spring-loaded reel inside of a case, and is provided with a handle grip outside of the case. The method for using the tool includes the steps of wrapping the line around the thermoplastic sheath at the point where it is to be severed, supporting the cable firmly against the case, and pulling briskly and firmly on the cable grip to cause the line to move out of the case against the action of the reel biasing spring, thus generating sufficient friction as it slides around the thermoplastic sheath to cut through the sheath to the paper underneath.

10 Claims, 6 Drawing Figures

U.S. Patent    Aug. 16, 1983    4,398,347
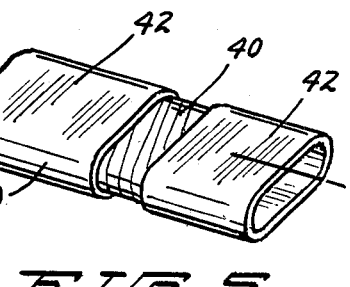
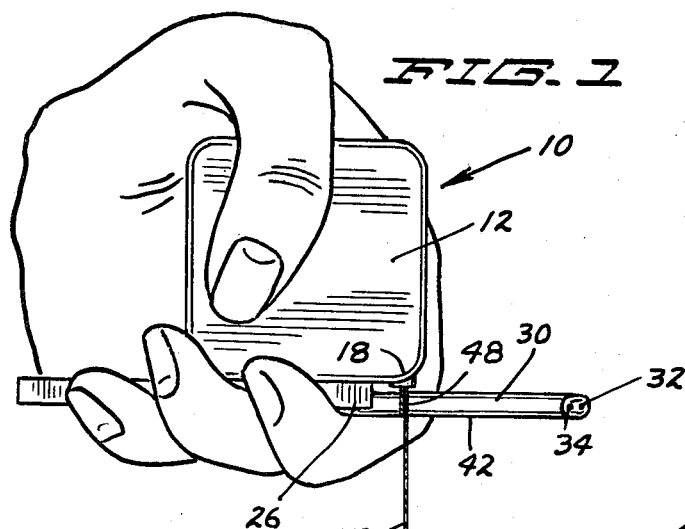
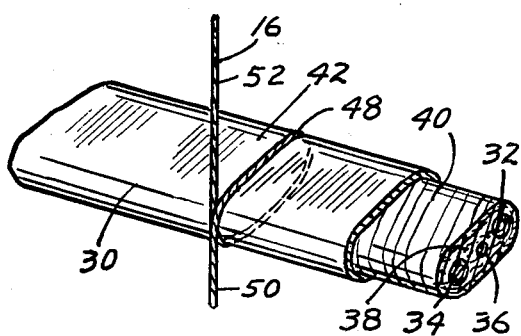
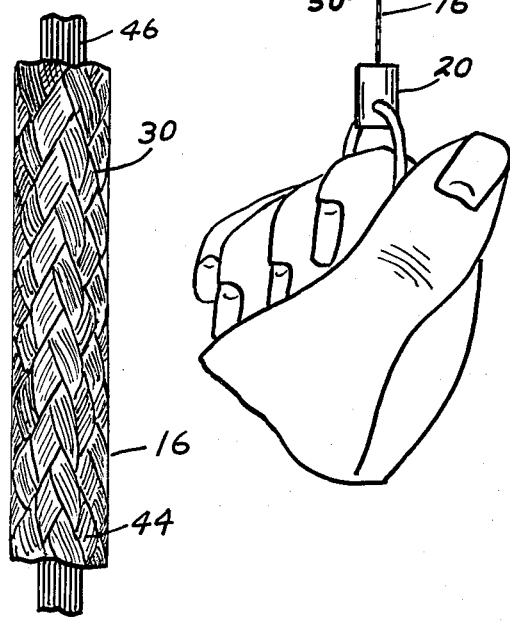
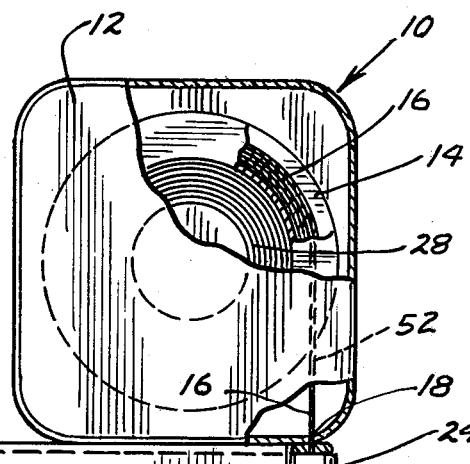
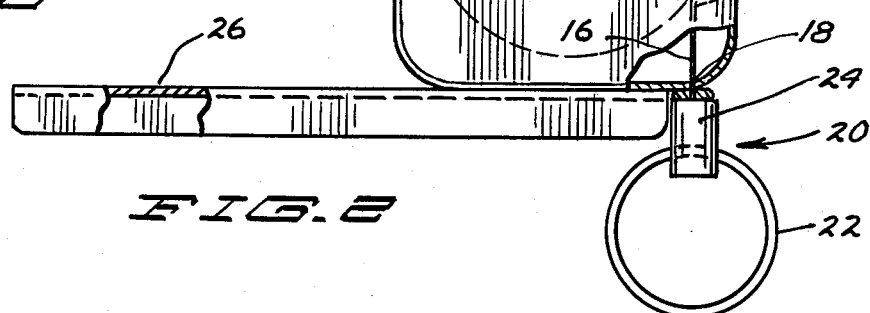
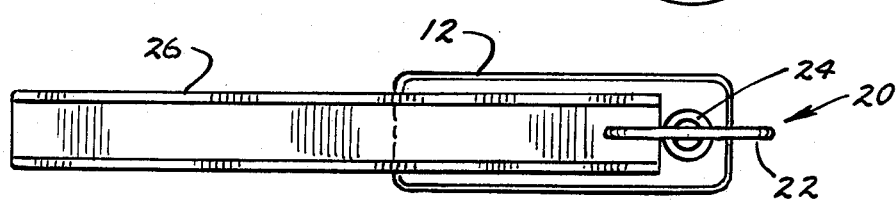

TOOL FOR SEVERING THERMOPLASTIC ELECTRICAL CABLE SHEATH

BACKGROUND OF THE INVENTION

1. Field of the Invention

This invention has relation to a tool and a method for severing the thermoplastic covering or sheath around an electrical cable so that the severed piece of the sheath can be slid off of the cable to permit the wires inside to be separated, stripped at their ends, and connected to other electrical conductors. Such a tool and the use of such a method is particularly important to installers of original ROMAX or pbx or similar electrical cables in the construction of homes and industrial and commercial buildings where any saving of time during installation can be very important economically. Such a tool and method are also important to the home handyman and professional installer of new and supplemental wiring in existing structures.

2. Description of the Prior Art

Prior to the present invention, an installer would use a pocketknife or, more usually, a sheet rock knife also called a retractable razor blade holder, to slit the sheath longitudinally for the length that was to be removed. The sheath was then pulled off sideways from the paper wrapping and wires inside and a side cutting pliers was used to cut away the sheath and the paper wrappers so that the bare ground wire and the two or three insulated conductors were uncovered so that they could be attached to other electrical conductors in a junction box, in a switch box, or to some electrical appliance.

Many other devices for slitting the nonmetallic sheath longitudinally have been used. These include a device having a holder supporting a triangular blade which sticks down into the cable, hopefully between the insulated conductors in the cable, the installer wrapping his band around the cable and pulling the triangular blade the entire length of the cut and off of the end of the cable. Here again, the sheath must be peeled away and side cutting pliers used to cut it off where the slit was started. After this is accomplished, the paper wrapping was then cut off and only then were the insulated conductors available to be stripped at their own ends and so that they and the bare ground conductor were ready to be installed.

The difficulty with the use of a pocket knife or a sheet metal knife with a retractable razor edge point, and the trouble with the various stripping tools such as the one described immediately above is that sooner or later in a day work, the blade will knick one of the insultated conductors, leaving a weak point in the insulation. If this point happens to end up underneath the metallic clamp or adjacent a similar weak point in an adjacent insulated conductor, the insulation may eventually break down. In this instance, failure of the electrical circuit may be the least of the problems, and sparking and fire may be the worst.

In a preliminary search of this invention, the following U.S. patent documents were cited:

| U.S. PATENT DOCUMENTS | | |
|---|---|---|
| D.247,268 | 2/78 | Quenot |
| 809,532 | 1/06 | Schnackenberg |
| 1,906,582 | 5/33 | Gundlach |
| 2,192,056 | 2/40 | Watts |
| 3,143,635 | 4/64 | Hooker |

| -continued | | |
|---|---|---|
| U.S. PATENT DOCUMENTS | | |
| 3,968,670 | 7/76 | Quenot |
| 4,055,616 | 10/77 | Keen et al |

The concept of severing a cable sheath by burning or melting using a hot wire as an energy source is shown in the patents to Watts and to Keen. While these structures may be effective in factory installations, their bulk, weight, size, complexity and immobility render then ineffective for use in the installation of electrical cable "on the job" in the construction field. Also, the structures of Watts and Keen are much better adapted to be effective on round cables than on the oval shape cables of tow and three and more wires as used in construction. This is because of the difficulty of conforming the solid shape heating elements of Watts and Keen to the irregular shapes of cables used in construction.

A further difficulty with the teachings of the Watts and Keen patent grows out of the fact that there must be some substantial dwell time in the heating of the thermoplastic cable using these structures. Thus there is always a possibility that this heat will be transferred to the thermoplastic coatings on the interior insulated wires of a ROMAX cable, for example. Such heat can cause a weakening or a thinning of the insulation on the insulated wires and can cause troublesome weak spots in that insulation.

The Hooker patent discloses another thermal wire stripper which is, in the present context, subject to somewhat the same difficulties as those of Watts and Keen. It is more portable than Watts or Keen, but requires the availability of electrical power at the point of use.

The ancient patents to Scnackenberg and Gundlach simply disclose the use of cords to cut entirely through relatively soft materials. The patents are not believed to be particularly pertinent to the present invention.

The Quenot mechanical and design patents are cited to show key ring retaining and retrieving structures of a type which can be adapted for use in connection with the present invention. A number of different structures similar to those shown in the Quenot patents will be perfectly satisfactory for use in connection with the present invention; and the specific construction of the Quenot mechanical patent forms no part of the present invention per se.

The applicant and those in privity with him are aware of no prior art which is closer than that discussed above and are aware of no prior art which anticipates the claims made herein.

SUMMARY OF THE INVENTION

A tool for severing a thermoplastic or other heat reactive cable sheath includes an elongated flexible sheath-severing line, a case and a spring-loaded reel or other means for storing, dispensing and retrieving the line, and a handle grip outside of the reel and case or other means attached to the line for allowing the line to be rapidly pulled from the storage, dispensing and retrieving means.

The method used to sever the sheath is to wrap the sheath-severing line around the sheathed cable, and to them pull briskly and firmly on the line while holding the line loop firmly about the cable. This action causes the friction between the line and the sheath to generate a very narrow band of intense heat which instantaneously melts the cable sheath for only about the width of the diameter of the line, thus cutting through the thermoplastic sheath.

A braided flexible sheath-severing line having a high coefficient of friction with respect to a heat reactive cable sheath to be severed will generate more heat than a smoother line, but each will be effective to some degree.

BRIEF DESCRIPTION OF THE DRAWINGS

FIG. 1 is a side elevational view of the tool for severing thermoplastic electrical cable sheath shown in the process of being used manually to cut through the outer sheath of an electrical cable;

FIG. 2 is an enlarged side elevational view of the tool of the invention with parts in section and parts broken away;

FIG. 3 is a bottom plan view of the tool as seen in FIG. 2;

FIG. 4 is a perspective and schematic view of a flexible sheath-severing line of the tool wrapped in an operating position around a length of electrical cable as it would appear in the process of severing the thermoplastic sheath of that cable;

FIG. 5 is a perspective view of a length of electrical cable after the sheath has been severed and illustrates the severed portion of the sheath being removed; and FIG. 6 is a greatly enlarged elevational view of a piece of sheath-severing line useful as part of the tool of the invention.

DETAILED DESCRIPTION OF THE PREFERRED EMBODIMENT

A tool 10 for serving thermoplastic electrical cable sheath includes a case 12 enclosing a reel 14 on which is wound a flexible sheath severing line 16. The line 16 extends out through the case through an opening 18 provided in the case. An outer end of the line is anchored outside of the case in any usual or preferred manner (not specifically shown) in a handle grip 20 which includes a ring 22 and a stop collar 24.

Integrally attached to the bottom of the case 12 is a channel-shaped member 26. This channel member 26 terminates adjacent to the opening 18 in the case.

The reel 14 is supported within the case 12 in such a manner that pulling on the handle grip 20 will cause the reel 14 to turn to unwind the flexible line 16 from the case and the reel. A coil spring 28 within the case is associated with the reel so that release of the handle grip will allow the reel to rotate to wind the line and handle grip back to the position as seen in FIGS. 2 and 3, for example. Such case, line and reel mechanisms are currently used for supporting keys and key rings in such a manner that they can be pulled away from the case in order to be used to open locks and then released to be brought back up to hang beneath the case. The specific internal construction of the case and take up reel form no part of the present invention per se. The tool of the invention will be useful to sever thermoplastic sheaths or other heat reactive sheaths on cables or other elongated rounded structures. It is particularly effective for severing such sheaths where they surround and protect electrical cables so that the severed portions of the sheaths can be pulled from the cables to give access to the wires underneath for the purpose of hooking them to electrical fittings of various kinds. The invention is described herein in connection with a cable 30 having two insulated wires 32 and 34 on either side of a bare ground wire 36, the ground wire being surrounded by a first paper wrapper 38 to fill the space between the two insulated wires, and the entire set of three wires being further wrapped in a second paper wrapper 40, and covered by a thermoplastic sheath 42, which is to be severed.

Before the individual insulated wires 32 and 34 and the ground wire 36 can be attached to other wires in a junction box or to the terminals of electrical appliances or switches, the sheath 42 must be removed to separate and uncover the desired length of these wires. To accomplish this, the electrical cable 30 to be stripped is positioned as seen in FIG. 1 within the channel member 26 and with the place where the sheath is to be severed located directly beneath the case opening 18. The handle grip 20 is grasped by the operator either by inserting a finger through the ring 22 or otherwise, and a sufficient length of flexible line 16 is withdrawn to allow that line to be wrapped around the cable sheath as seen in FIG. 1 and as shown schematically in FIG. 4 to form a loop or bight 50, a first or lower standing part 48 and a second or upper standing part 52. At this point, the stop collar 24 will be positioned as close to the electrical cable 30 as is possible while still allowing a complete wrap of line 16 around the cable sheath.

Holding the tool and cable firmly in one hand, the handle grip is then moved rapidly with the other hand along the longitudinal axis of line first standing part 50 to cause the loop 48 of the flexible line 16 to be drawn rapidly around the entire periphery of the cable sheath 42. This action generates substantial localized heat, and the line cuts, melts or burns its way through the sheath but has little, if any, effect in penetrating the second paper wrapper 40. The amount of line which must be drawn over and around the cable sheath to be effective is determined by the thickness and other physical properties of the sheath, the longer the line used, the more severe the cutting or melting action.

When the sheath 42 has been so severed, it and the cable can be flexed in the area of the cut, thus separating the short end of the sheath from its remainder. Then that severed short end of the sheath 42 can be withdrawn from the cable either manually or with the use of pliers or some other appropriate and convenient instrument.

The paper wrappers can then easily be peeled away and cut off in adjacent relationship to the remaining sheath, and the electrical wires are then available for use for their intended purpose.

A number of different sheath-severing lines can be used as the flexible line 16 of the present invention. For example, a line which has been found excellent for the purpose is a braided trolling line sold by Cortland Line Company of Cortland, N.Y. under the trademark MICRON. A short piece of that line is illustrated in FIG. 6. The line consists of an outer sleeve 44 of woven polyester fabric around many fine polyester filaments forming a center core 46. In practice, an 80 pound test line has been found to be excellent and to last for approximately 400 cuts or severing operations on a pbx cable such as described herein. A 50 pound test line of the same description was also effective and made approximately 150 such cuts before having to be replaced.

Braided nylon lines and braided dacron lines have been used satisfactorily, but they don't have the wear resistance of the MICRON brand line described above. Any flexible line which generates heat when pulled around a thermoplastic cable sheath from top to bottom, for example, as seen in FIG. 4, will be effective in the tool of the invention.

While a hand-held tool is illustrated in FIG. 1 as being operated by manually pulling the flexible line, the invention would be no different if the holding reel 14 were permanently mounted to a base, and the handle grip 20 were mechanically operated to draw the line 16 around the thermoplastic sheath 42 of an electrical cable or other cable 30.

Although the present invention has been described with reference to preferred embodiments, workers skilled in the art will recognize that changes may be made in form and detail without departing from the spirit and scope of the invention.

What is claimed is:

1. A method of severing a heat reactive sheath forming an outer layer of an elongated object, said method including the steps of:
    wrapping an elongated flexible line having a braided outer surface which has a high coefficient of friction with respect to a sheath to be severed in a closed loop around the circumference of such a sheath to be severed and positioning ends of that line to extend away from each other and away from said sheath in tangential relation to said sheath; and
    rapidly moving the line by drawing one of its ends in a longitudinal first direction away from the sheath while maintaining the line loop in firm contact with the sheath, thus to draw the line around the circumference of the sheath to cause sufficient heat of friction between the line and the sheath to melt through the sheath.

2. A tool for severing a heat reactive sheath forming the outer layer of an elongated object, said tool including:
    an elongated flexible sheath-severing line having a braided outer surface which has a high coefficient of friction with respect to a heat reactive sheath to be severed, said line being adapted to be looped around the circumference of an elongated object covered by such a heat-reactive sheath at the place where the sheath is to be severed and to have standing parts extending away from the loop in opposite directions;
    means for fixedly positioning the encircled portion of the elongated object; and
    means for rapidly pulling the line in a first direction while maintaining the line loop tightly against the sheath.

3. The tool of claim 2 wherein:
    said means for maintaining the line loop tightly against the sheath includes a case, a reel within the case on which a quantity of the flexible line is wound, and resilinet means to tend to resist line movement away from the case and off of the reel; and
    said means for pulling the line in a first direction includes a handle grip attached to an outer end of the line outside of said case, said sheath-covered elongated object being adapted to be positioned between said case and said hand grip after said line is looped about said object.

4. The tool of claim 3 wherein:
    said means for fixedly positioning the elongated object is constituted as an elongated rigid member integral with said case in position to support said sheath-covered elongated object on at least one side of the point where the sheath is to be severed.

5. A tool for severing a heat reactive sheath forming the outer layer of an elongated object, said tool including:
    an elongated flexible sheath-severing line adapted to be looped around the circumference of a sheath-covered elongated object at the place where the sheath is to be severed and to have standing parts extending away from the loop in opposite directions;
    means for fixedly positioning the encircled portion of the elongated object;
    means for rapidly pulling the line in a first direction while maintaining the line loop tightly against the sheath;
    wherein said means for maintaining the line loop tightly against the sheath includes a case, a reel within the case on which a quantity of the flexible line is wound, and resilient means to tend to resist line movement away from the case and off of the reel;
    wherein said means for pulling the line in a first direction includes a handlegrip attached to an outer end of the line outside of the case, said sheath-covered elongated object being adapted to be positioned between said case and said handgrip after said line is looped about said object;
    wherein said means for fixedly positioning the elongated objected is constituted as an elongated rigid member integral with said case in position to support said sheath-covered elongated object on at least one side of the point where the sheath is to be severed;
    wherein said case is provided with an opening through which said flexible line extends; and
    wherein said elongated rigid member is constituted as a channel-shaped member against which the heat reactive sheath can be braced during the sheath-severing movement of the line.

6. The tool of claim 5 wherein:
    said elongated object is a multi-wire electrical cable and said heat reactive sheath is a thermoplastic sheath.

7. The tool of claim 5 wherein:
    said elongated sheath-severing line has a woven fabric outer surface.

8. The tool of claim 7 wherein:
    said line includes an outer sleeve of woven polyester fabric and an inner core of polyester filaments.

9. The tool of claim 8 wherein:
    said line has a uniform outer diameter, said diameter falling within the range of 0.0028 inches to 0.0044 inches.

10. The tool of claim 8 wherein:
    said line has a uniform outer diameter, said diameter falling within the range of 0.07 mm to 0.1 mm.

* * * * *